(12) United States Patent
Kovács (10) Patent No.: US 10,440,521 B2
(45) Date of Patent: Oct. 8, 2019

(54) CONNECTION-LESS MESH NETWORKING

(71) Applicant: TenTen Kabushiki Kaisha, Tokyo (JP)

(72) Inventor: Alexander Imre Kovács, Iruma (JP)

(73) Assignee: TenTen Kabushiki Kaisha, Tokyo (JP)

( * ) Notice: Subject to any disclaimer, the term of this patent is extended or adjusted under 35 U.S.C. 154(b) by 189 days.

(21) Appl. No.: 15/071,953

(22) Filed: Mar. 16, 2016

(65) Prior Publication Data

US 2016/0278000 A1   Sep. 22, 2016

Related U.S. Application Data

(60) Provisional application No. 62/134,189, filed on Mar. 17, 2015.

(51) Int. Cl.
| | |
|---|---|
| *H04W 4/06* | (2009.01) |
| *H04W 84/18* | (2009.01) |
| *H04W 48/12* | (2009.01) |

(52) U.S. Cl.
CPC .............. *H04W 4/06* (2013.01); *H04W 48/12* (2013.01); *H04W 84/18* (2013.01)

(58) Field of Classification Search
CPC ..... H04W 84/18; H04W 48/10; H04W 48/16; H04W 4/005; H04W 4/22; H04W 52/0235; H04W 84/12; H04W 48/12; H04W 4/06; H04L 63/0853; H04L 67/12; H04L 41/0803; H04L 41/0816; H04L 41/0836; H04L 45/22; Y02B 60/50

See application file for complete search history.

(56) References Cited

U.S. PATENT DOCUMENTS

| | | | |
|---|---|---|---|
| 6,842,460 B1* | 1/2005 | Olkkonen | H04W 48/16 370/328 |
| 2015/0036823 A1* | 2/2015 | Graube | H04W 12/02 380/274 |
| 2016/0099862 A1* | 4/2016 | Stellick | H04L 45/28 709/223 |
| 2016/0234765 A1* | 8/2016 | Tannenbaum | H04W 52/0235 |

\* cited by examiner

*Primary Examiner* — Kevin C. Harper
*Assistant Examiner* — Mon Cheri S Davenport
(74) *Attorney, Agent, or Firm* — Fitch, Even, Tabin & Flannery LLP (57) ABSTRACT

A node forms a connection-less mesh network with one or more other nodes. The node controls to generate an identifier that identifies the node; to update the identifier and a data payload; to periodically wirelessly broadcast, at a predetermined frequency, broadcast-information that comprises the generated identifier and the updated data payload; and to periodically receive, at a predetermined frequency, other-broadcast-information which is the broadcast-information respectively broadcast from each of the one or more other nodes. The one or more processors performs the update of the identifier and the data payload in accordance with the other-broadcast-information from the other nodes.

20 Claims, 5 Drawing Sheets

Protocol Data

| Node ID | Active Node ID | Requesting Active? | Distance Estimation |
|---|---|---|---|
| 401 | 402 | 403 | 404 |

CONNECTION-LESS MESH NETWORKING

This application claims the benefit of U.S. Provisional Application No. 62/134,189 filed on Mar. 17, 2015, the entire content of which is incorporated herein by reference.

FIELD OF THE INVENTION

The present invention relates to a node, system, method and storage medium for a connection-less mesh networking.

BACKGROUND OF THE INVENTION

In current mesh or peer-to-peer networking protocols, there is a focus on securely and reliably transmitting data in sequence in two-way communications. Such protocols require substantial overhead because they establish communication sessions before any useful data is transferred, and they perform error checking, transmission acknowledgments, or the like, in order to accomplish those goals.

One example of this is a connection in the communication technology Bluetooth (registered trademark) Low Energy (BLE), for example. In BLE, it is possible to perform two-way communication between two nodes by establishing a connection. In order to establish a connection a master device must first discover a device advertising itself in a broadcast mode. The master sends a connection request to the broadcaster, and bidirectional communication is subsequently performed in accordance with parameters of the connection request. The connection must be managed, and may be lost under certain circumstances. In the communication, error checking using a cyclic redundancy check (CRC) is performed, and packets are retransmitted when errors are discovered.

For use cases requiring only small amounts of data to be transmitted (for example, transmitting which one of a plurality of nodes in a network is currently "active"), overhead is quite high in terms of bandwidth, and complexity relative to the amount of data being transmitted when connections such as those used in BLE are used. That overhead leads to performance issues such as lags occurring when extensive checking is performed to ensure that every node in the network has the correct information, for example. Accordingly, such protocols may be unsuitable for network systems in which nodes must become aware of changes quickly.

SUMMARY

According to various embodiments of the present invention, a node is operable to form a connection-less mesh network with one or more other nodes. Each of the nodes comprises a transmitter operable to transmit information wirelessly to the one or more other nodes, a receiver operable to receive wirelessly transmitted information from the one or more other nodes, a memory operable to store a program, and one or more processors operable to read the program from the memory, and to control, in accordance with the program, the transmitter and the receiver by executing the program, wherein the one or more processors, controls to generate an identifier that identifies the node, controls to update the identifier and a data payload, controls the transmitter to periodically wirelessly broadcast, at a predetermined frequency, broadcast-information that comprises the generated identifier and the updated data payload, and controls the receiver to periodically receive, at a predetermined frequency, other-broadcast-information which is the broadcast-information respectively broadcast from each of the one or more other nodes and wherein the one or more processors performs the update of the identifier and the data payload in accordance with the other-broadcast-information from the other nodes.

Other aspects of the present invention will become apparent from the following description of exemplary embodiments with reference to the attached drawings.

DETAILED DESCRIPTION

The present invention will be explained below using specific embodiments for explanatory purposes, but it should be understood that the invention is not limited to these embodiments.

In embodiments of the present invention a plurality of nodes 100 form a connection-less mesh network in which data is propagated rapidly to all nearby nodes 100. Without establishing connections/sessions with other nodes 100, each of the nodes 100 periodically wirelessly broadcasts (also referred to as "advertises"), at a predetermined frequency, information comprising an identifier (ID) that identifies itself and a data payload. In addition, each of the nodes 100 periodically receives, at a predetermined frequency, the broadcasts from all of the other nodes 100. Also, each of the nodes 100 dynamically generates/updates the data payload in accordance with input information (such as input by a user touching a touch panel of the node 100) that the respective node 100 receives, or in accordance with the information received when receiving the broadcasts of the other nodes 100. Also, each of the nodes may change their identifier at any time for example to resolve a conflict.

In some embodiments, the nodes 100 are, for example, mobile devices such as smart phones or tablets which are capable of transmitting and receiving radio waves at predetermined frequencies, and which comprise a memory for storing programs and data, and one or more processors (a CPU 101, for example) for controlling the device by executing programs, for example.

In some embodiments, the periodic connection-less broadcast communications may be realized by each of the nodes 100 both broadcasting (by advertising) and receiving broadcasts (by scanning) exclusively in the broadcasting mode of BLE (Bluetooth Low Energy) without establishing connections (in which communications are directed to a particular device) with the other nodes 100. In some embodiments, this broadcasting is performed using Apple's iBeacon (registered trademark) specification.

In the broadcasting mode of BLE, it possible to transmit one-way (one-to-many) messages on predetermined frequencies. An observer communication apparatus can receive the one-way messages transmitted from a broadcaster by scanning the predetermined frequencies repeatedly. The nodes 100, in some embodiments, periodically broadcast the information in a broadcaster (peripheral) role of BLE, and receive the broadcasts of all of the other nodes 100 in an observer (central) role of BLE. Here, by both broadcasting and receiving these one-way messages, the nodes 100 effectively form a mesh network in which rapid many-to-many communication of information (such as a state of the network, for example) that is dynamically updated based on the information received in the broadcasts is achieved.

Note the predetermined frequencies for the broadcasting and scanning may be comprised in frequency bands corresponding to "advertising channels" in BLE, for example. In embodiments where the broadcasting is performed by BLE, the broadcasting may also be referred to as "advertising".

In some embodiments, a program stored in the non-volatile memory (a ROM 103, for example) of each of the nodes 100, loaded into a volatile memory of the respective node 100 (a RAM 102, for example), and executed under the control of a CPU 101 of the respective node 100, controls the node 100 to perform the above described broadcasting (advertising), receiving (scanning), and generating/updating of data. An example of a specific embodiment in which the CPU, by executing such a program, notifies the user of the corresponding node 100 when the node 100 becomes "active" or "inactive" is given. This example is explained below in detail, with reference to the attached drawings. Note that this detailed example is exemplary, and is not intended to limit the scope of the invention.

The plurality of nodes 100 that form the connection-less mesh network may be user terminals, for example. The user terminals may be, for example smartphones, tablet devices, PDAs or any other device having wireless functionality according to the embodiments of the invention. Hereinafter, the nodes 100 will be assumed to be smartphones, for example. The above described program is installed on each of the smartphones. It is assumed that each of the nodes 100 may comprise hardware such as a transmitter 105 capable of performing broadcasting (wirelessly transmitting data), a receiver 106 capable of receiving broadcasts (receiving wireless transmissions), a memory (a RAM 102 or a storage unit 104) capable of storing received information and the program, and a CPU 101 capable of executing overall control. The CPU 101, by executing the program, is able to control the transmitter 105 to perform broadcasting, control the receiver 106 to receive broadcasts, control the memory to store and retrieve data (information), and control other hardware such as a touch panel display (an output device 107, an input device 108) to perform corresponding functions (such as display a UI (User Interface) screen or receive touch input).

In the current example, one of the plurality of nodes 100 can receive a reward (such as loyalty point information) from a transaction apparatus 200. The transaction apparatus 200 may be comprised in a vending machine, a POS terminal (Point of Sale), a ticketing machine, an automated teller machine (ATM) or any other device which can issue points to a user in response to a verification of a user operation, such as a purchase of goods by the user, for example. Hereinafter, the embodiments will be described using the example of a vending machine as the transaction apparatus 200. Note that there are embodiments where no such transaction apparatus is required and the nodes for a mesh network for some other purpose without such a transaction apparatus.

It is assumed that the transaction apparatus 200 also comprises a wireless transmitter 205 and receiver 206, a CPU 201 and a memory (RAM 202, ROM 203, storage unit 204), as described in detail below. The transaction apparatus 200 is configured to periodically broadcast identification information by which the nodes 100 can determine that they are in the proximity of the transaction apparatus 200. The transaction apparatus 200 is further configured to transmit reward information related to a transaction made in the transaction apparatus 200. For example, the reward information may be transmitted in response to a product being purchased from the transaction apparatus 200 (vending machine) by a user of one of the nodes 100. When the one of the nodes 100 executing the program receives this reward information, it performs processing to associate the reward (loyalty points corresponding to the purchase, for example) with the user account of the user logged into the program, for example. This processing may include transferring identification information and the reward information to a remote server for example.

Figure 1:
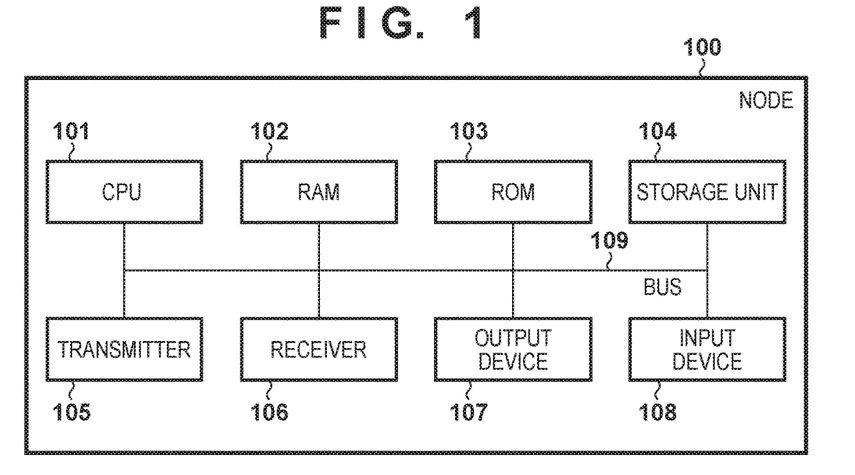
FIG. 1 is a hardware configuration diagram of each of a plurality of nodes according to some embodiments of the present invention.

FIG. 1 is a hardware configuration diagram of each of the plurality of nodes 100 according to some embodiments of the present invention. The node 100 comprises a central processing unit (CPU) 101, a random access memory (RAM) 102, a read-only memory (ROM) 103, a storage unit 104, a transmitter 105, and a receiver 106, an output device 107 and an input device 108. All of these components are connected to each other by a bus 109.

The CPU 101 is a hardware processor that can control overall operation of the node 100 by reading a computer program that is stored in the ROM 103 into the RAM 102, and executing instructions of the program. For simplicity only a single CPU 101 is illustrated, but it should be noted that there may be multiple instances of the CPU 101 that work in cooperation to execute instructions for achieving the functionality of the node 100. The CPU 101 may be any processor capable of executing instructions of the program.

The transmitter 105 is a device for transmitting data in accordance with a particular communication specification such as BLE to other nodes 100 or to the transaction device 200, for example. The transmitter 105 may also transmit data packets over a computing network such as the Internet and include various types of interfaces such as, for example, universal serial bus (USB), Ethernet, IEEE1394, radio frequency (RF), near-field communications, 802.11 (WiFi), TCP/IP and the like. The CPU 101 controls the transmitter 105 to transmit data in accordance with the program by sending control signals to the transmitter 105 via the bus 109.

The receiver 106 is a device for receiving data in accordance with a particular communication specification such as BLE from other nodes 100 or from the transaction device 200, for example. The receiver 106 may also receive data packets over a computing network such as the Internet and includes various types of interfaces such as, for example, universal serial bus (USB), Ethernet, IEEE1394, radio frequency (RF), near-field communications, 802.11 (WiFi), TCP/IP and the like. The CPU 101 may control the receiver 105 to receive data in accordance with the program by sending control signals to it via the bus 109.

The storage unit 104 is a non-volatile storage device capable of storing various kinds of data. In some embodiments, the storage unit 104 is a built-in memory device, for example, and in other embodiments it is detachably mounted to the node 100. The output device 107 is a device for presenting information to the user of the node 100, such as a display of an LCD or the screen of mobile phone for example, that outputs information to the user of the node 100. The display 107 may be built into the node 100, or may be externally attached to the node 100.

The output device 107 is not limited to visual output devices, and may comprise an audio output device, for example, such as a speaker.

The input device 108 is a device that the user of the node 100 uses to input information into the node 100. The input device 108 may be a touch panel device that is built into the display 107 integrally. The input device 108 is not limited to this, however, and may comprise an audio input device such as a microphone.

In some embodiments, the functionality of the node 100 can be realized by the CPU 101 executing a software program stored in the ROM 103 using the RAM 102 as a work area. In accordance with the program, the CPU 101 can control the operation of the other components of the node 100 by sending controls signals thereto, and receiving signals therefrom over the bus 109.

Figure 2:
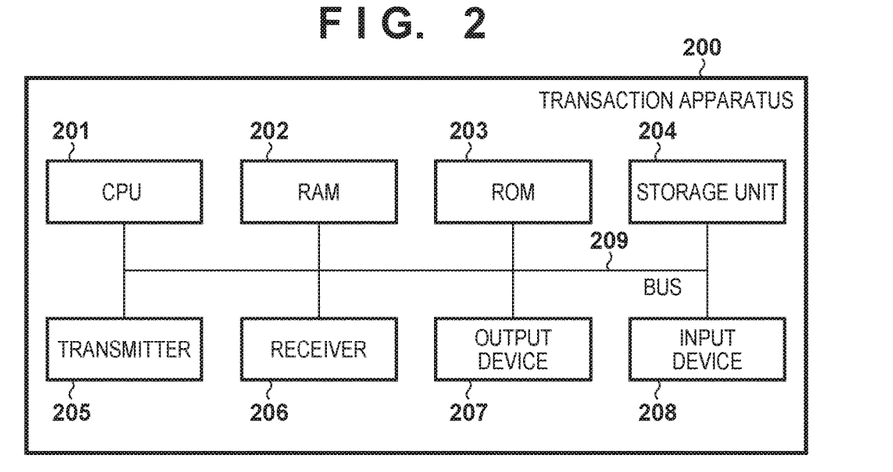
FIG. 2 is a hardware configuration diagram of a transaction apparatus according to some embodiments of the present invention.

FIG. 2 is a hardware configuration diagram of the transaction apparatus 200 according to some embodiments of the present invention. The transaction apparatus 200 comprises a central processing unit (CPU) 201, a RAM 202, a ROM 203, a storage unit 204, a transmitter 205, and a receiver 206, an output device 207 and an input device 208. All of these components are connected to each other by a bus 209.

The CPU 201 is a hardware processor that can control overall operation of the transaction apparatus 200 by reading a computer program that is stored in the ROM 203 into the RAM 202, and executing instructions of the program. For simplicity only a single CPU 201 is illustrated, but it should be noted that there may be multiple instances of the CPU 201 that work in cooperation to execute instructions for achieving the functionality of the transaction apparatus 200. The CPU 201 may be any processor capable of executing instructions of the program.

The transmitter 205 is a device for transmitting data in accordance with a particular communication specification such as BLE to the nodes 100 or another device with a wireless communication function, for example. The transmitter 205 may also transmit data packets over a computing network such as the Internet and include various types of interfaces such as, for example, universal serial bus (USB), Ethernet, IEEE1394, radio frequency (RF), near-field communications, 802.11 (WiFi), TCP/IP and the like. The CPU 201 can control the transmitter 205 to transmit data in accordance with a program by sending control signals to it via the bus 209.

The receiver 206 is a device for receiving data in accordance with a particular communication specification such as BLE from the nodes 100, for example. The receiver 206 may also receive data packets over a computing network such as the Internet and includes various types of interfaces such as, for example, universal serial bus (USB), Ethernet, IEEE1394, radio frequency (RF), near-field communications, 802.11 (WiFi), TCP/IP and the like. The CPU 201 can control the transmitter 205 to transmit data in accordance with a program by sending control signals to it via the bus 209.

The storage unit 204 is a non-volatile storage device capable of storing various kinds of data. In some embodiments, the storage device is a built-in memory device, for example, and in other embodiments it is detachably mounted to the transaction apparatus 200.

The output device 207 is a device, such as a display of an LCD for example, that outputs information to a user who wishes to purchase goods from the transaction apparatus 200. The display 207 may be built into the transaction apparatus 200, or may be externally attached to the transaction apparatus 200. The output device 207 is not limited to visual output devices, and may comprise an audio output device, for example, such as a speaker.

The input device 208 is a device that the user of the transaction apparatus 200 uses to input information or an instruction into the transaction apparatus 200. The input device 208 may be a touch panel device that is built into the display 207 integrally and/or buttons to be used by the user to select goods to be purchased. The input device 208 is not limited to this, however, and may comprise an audio input device such as a microphone.

In some embodiments, the functionality of the transaction apparatus 200 can be realize by the CPU 201 executing a software program stored in the ROM 203 using the RAM 202 as a work area. In accordance with the program, the CPU 201 can control the operation of the other components of the transaction apparatus 200 by sending controls signals thereto, and receiving signals therefrom over the bus 209.

The transaction apparatus 200 may be built into or externally mounted to a vending machine, a POS terminal (Point of Sale), a ticketing machine, an automated teller machine (ATM) or any other device which can issue points to a user in response to a verification of a user operation, for example.

Figure 3:
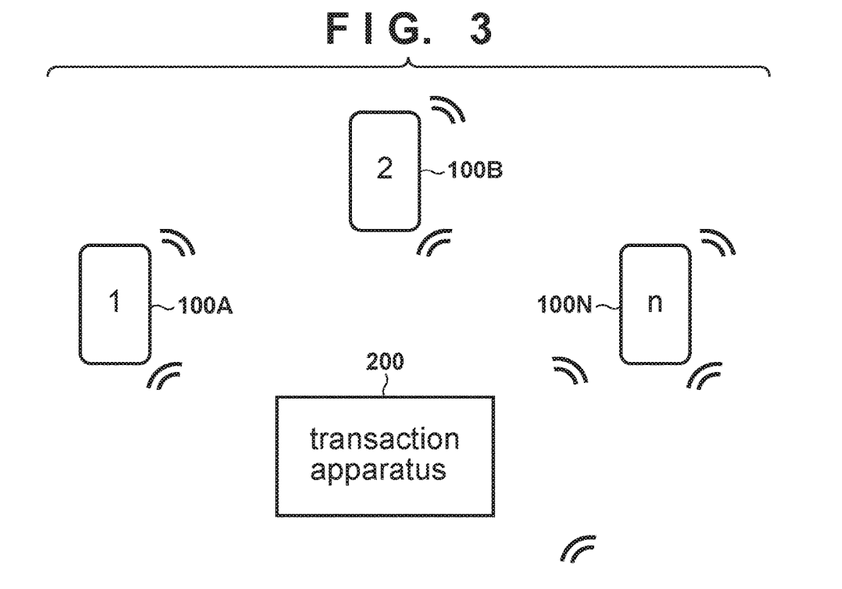
FIG. 3 shows a system view of the present invention.

FIG. 3 shows a system view for the example explained below. A plurality of the nodes 100 having identifiers of 1-n exist in the proximity of the transaction apparatus 200. The optional transaction apparatus 200 broadcasts transmissions to all of the nodes 100. Similarly, each of the nodes 100 broadcast transmissions to all of the other nodes 100, and receive the broadcasts from each of the other nodes 100 and from the transaction apparatus 200.

Only the user account logged into the program executing on the node 100 (the active node 100) of the user that makes the purchase should be associated with the reward. In order to ensure this, the nodes 100, by the CPU 101 executing a program, control so that the plurality of nodes 100 form the above described connection-less mesh network to rapidly communicate to each other which of them is the active node 100. By doing so, the users of the nodes 100 can be notified which one of them is active so that they can time their corresponding purchase to when it is notified that their node 100 is currently active.

The users of the nodes 100 activate the program installed on the node 100 when in the proximity of other users or the transaction apparatus 200 in order to receive the corresponding points, for example. Upon activation of the program, the respective CPU 101 of the node 100 initially causes the node 100 to make a notification to the user of the node 100 indicating that the node 100 is not currently active (not in a state in which it is ready to receive and process the reward communication from the transaction apparatus 200 (the inactive state). This is performed because the node 100 is not necessarily within a communicable range of the transaction apparatus 200. Also, even if the node 100 is within range of the transaction apparatus 200, there may be other nodes 100 similarly running the program that are within range of the transaction apparatus 200. In some embodiments this notification corresponds to the CPU controlling the node 100 to display (on the display unit 107 of the node 100, for example) a UI screen indicating that the node 100 is in the inactive state.

After making the notification, the node 100 scans a predetermined frequency at which the transaction apparatus 200 transmits the self-identifying broadcast communication. In addition to the transaction apparatus 200 identification information, this broadcast by the transaction apparatus 200 may include information that enables a receiving node 100 to estimate the distance of the node 100 from the transaction apparatus 200. For example, the transaction apparatus 200 may transmit an indication of what the RSSI (Received Signal Strength Indication) of the broadcast would be if received at a distance of one meter from the transmitter of the transaction apparatus 200. Based upon this value, and the actual RSSI, the node 100 can calculate an estimation of its distance from the transaction apparatus 200.

In addition to scanning for the broadcast from the transaction apparatus 200, each node 100 scans, at a predetermined frequency, in order to receive broadcasts from any other nodes 100 currently executing the program in the vicinity. Furthermore, each node 100 periodically broadcasts, at the predetermined frequency, information comprising an identifier which identifies the respective node 100. This identifier may be pseudo-randomly selected from a predetermined range of identifiers, for example. The nodes 100 do not establish connections with each other for this broadcasting or receiving.

Note that when the nodes 100 determine that the identifier that the node 100 pseudo-randomly selects collides with that of another one of the nodes 100 by analyzing the broadcasts received from the other nodes 100, the node 100 pseudo-randomly selects another identifier. The size of the range of identifiers can be determined in advance in accordance with what is determined to be an acceptable collisions rate. Selecting the range to be larger has the advantage of making the collision rate lower, while selecting the range to be smaller has the advantage that less data needs to be transmitted in the broadcasts.

Figure 4:
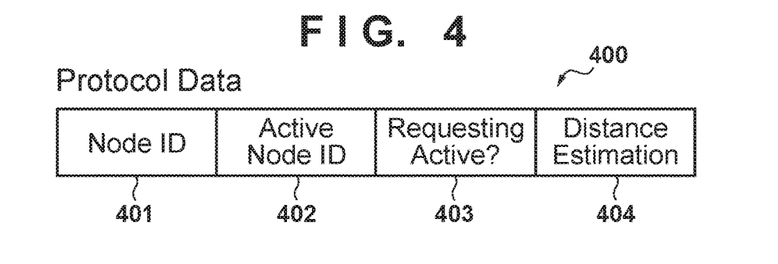
FIG. 4 illustrates an example of a protocol defining protocol data (broadcast-information) that is broadcast periodically.

In addition to the identifier, the broadcast information includes a small amount of payload information. The payload information in this example comprises information that indicates a current state of the network. Specifically, this information indicates the identifier of the node 100 that the broadcasting node 100 has determined to be active (an active node ID 402). If the broadcasting node 100 has yet to determine which node is active, information indicating that the active node ID 402 has yet to be determined may be comprised instead, for example.

Furthermore, the payload information of the broadcast may comprise information of a flag that indicates that the broadcasting node 100 desires to become the active node 100 (a requesting active flag 403). In some embodiments, this flag is set when, in a state in which a node 100 has determined one of the other nodes 100 to be the active node 100, the user of the node 100 performs an input operation in relation to a UI screen of the program, for example, indicating the desire to become the active node 100. For example, this operation may correspond to a touch input on a touch panel of the node 100.

Also, the payload information 400 may comprise information of the previously mentioned estimation of distance of the node 100 from the transaction apparatus 200, for example (distance estimation information 404).

Also, the payload information 400 may comprise a network identifier such that different mesh networks can co-exist in close proximity such that a node 100 would just ignore broadcasting signals from nodes 100 that belong to another network, for example.

In a state in which the node 100 has yet to determine which node 100 is the active node 100, the node 100 performs processing to determine which of the nodes 100 is the active node 100 upon receiving the self-identifying broadcast from the transaction apparatus 200. Note that configuration may be taken such that the node 100 only performs this processing under the condition that the broadcast from the transaction apparatus 200 indicates that the transaction apparatus 200 is within a predetermined distance of the transaction apparatus 200. This is to avoid situations in which nodes 100 are within range of the broadcasts of the transaction apparatus 200 but not in range of each other's broadcasts, for example.

In the processing to determine which of the nodes 100 is the active node, if no broadcast is received from any other node 100, the node 100 can determine itself to be the active node. In this case, the node 100 may notify the user of the node 100 that the node 100 is now active by display a UI screen on the LCD of the node 100, for example. In response, the user of the node 100 can make then purchase from the transaction apparatus 200, at which point the reward communication will be transmitted from the transaction apparatus 200. When the node 100 receives this transmission, it will perform processing to associate the user logged into the program that the CPU of the node 100 is executing with the loyalty points corresponding to the communication since the node 100 is determined to be the active node.

In some embodiments the transmission of the reward information from the transaction apparatus 200 to the active node 100 may be a connection-less broadcast transmission. In other embodiments, the active node 100 and the transaction apparatus 200 will establish a connection, after which the reward information will be transmitted from the transaction apparatus 200 to the active node 100.

Meanwhile, when the broadcast is received from any of the other nodes 100, the node 100 first determines if any of the other nodes 100 have already determined which node 100 is the active node 100. It does so by verifying the active node ID 402 in the payloads of each of the broadcasts that it received from the other nodes 100. If any of the other nodes 100 have already determined the active node 100, the node 100 stores, in its memory, information (the identifier, for example) indicating the current active node 100. Also, the node 100 subsequently uses that information to generate the data payloads for its own periodic broadcasts.

On the other hand, if the node 100 determines that none of the other nodes 100 has determined which node 100 is active, the node 100 determines which node 100 is active in accordance with the information of the payloads of each of the broadcasts received from the other nodes 100. For example, the node 100 may determine which node 100 is active based on the distance estimation information 404. In some embodiments, the node 100 determines whichever of the nodes 100 is estimated to be closest to the transaction apparatus 200 to be the active node 100. In some embodiments, the node 100 determines which of the nodes 100 is active based on the identifiers of the nodes 100. For example, the node 100 having the lowest identifier may be determined to be active. Other methods of determining which node 100 is active may be used, such as one based on both the estimated distance from the transaction apparatus 200 and the identifier, for example.

Note that determining which node 100 is active based on the distance estimation information 404 has the advantage that the node 100 that is closest to the transaction apparatus 200 (and therefore most likely to be the one whose user is actually making the purchase) is most likely to be determined to be active. However, if the active node 100 is determined simply based on the identifier, there is the advantage that the distance estimation information 404 need not be broadcast to the other nodes 100.

FIG. 4 illustrates an example of a protocol defining protocol data 400 (broadcast-information) that is broadcast periodically when the distance estimation information 404 is used. "Node ID" 401 corresponds to information of the identifier of the broadcasting node 100. "Active Node ID" 402 corresponds to information of the identifier of the node that the broadcaster determines to be active. "Requesting Active?" 403 corresponds to a flag that indicates whether the broadcaster is requesting to become active. "Distance Estimation" 404 indicates an estimated distance from the node 100 to the transaction apparatus 200. "Node ID" 401, "Active Node ID" 402 and "Distance Estimation" 404 comprise the payload information of the protocol data 400. Other possible data includes, but is not limited to, a network ID such that two separate mesh networks could operate in close proximity.

Figure 5:
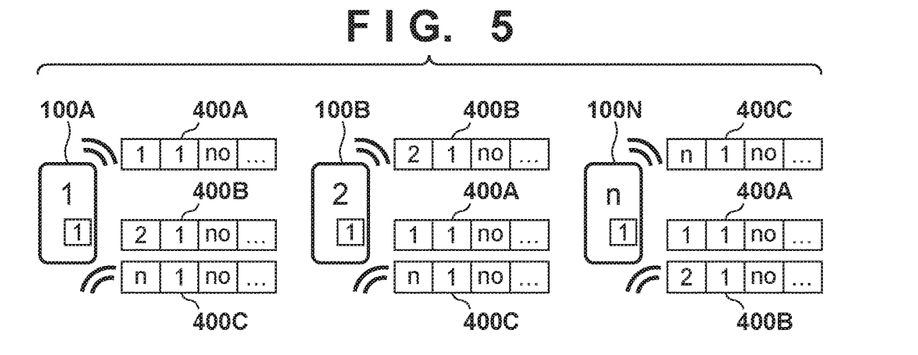
FIG. 5 illustrates an example of a situation in which n nodes have formed an ad hoc connection-less mesh network in accordance with embodiments.

FIG. 5 illustrates an example of a situation in which the n nodes 100 have formed an ad hoc connection-less mesh network in accordance with embodiments. The identifiers of each node 100 are shown in large bold type, where the identifier of the leftmost node 100A in the figure is "1", that of the center node 100B is "2", and that of the rightmost node 100N is "n". Each of the nodes 100 have determined that the leftmost node 100A having identifier "1" is the active node. This is illustrated by the small "1" surrounded by a square in each of the nodes 100 in the figure. Each of the nodes 100 are broadcasting their own identifier as the "Node ID" 401, "1" as the "Active Node ID" 402, "no" as the "Requesting Active?" flag 403, and the "Distance Estimation" 404, whose value is abbreviated as " . . . " for simplicity. Each node is also receiving the broadcasts of all of the other nodes.

Figure 6:
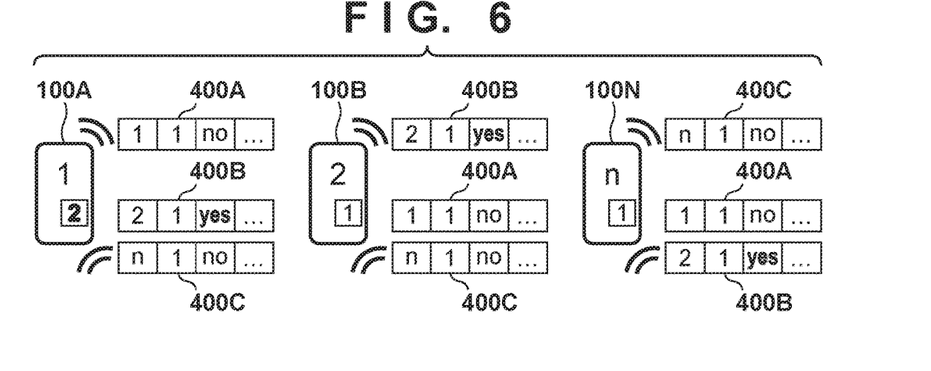
FIG. 6 illustrates an example in which a node is making a request to become the active node.

As described earlier, a user of a node 100 that is in the inactive state may perform an operation on the node 100 (input that the node 100 receives) in order to request to become the active node 100. In this case, the requesting active flag 403 will be set to YES in a subsequent broadcast of the node 100. FIG. 6 illustrates an example in which the node 100B with identifier "2" is making a request to become the active node 100.

When the active node 100 receives a broadcast from one of the other nodes 100 in which the requesting active flag 403 is set, the active node 100 is able to detect that the requesting node 100 wishes to become the active node 100 by analyzing the information of the requesting active flag 403 broadcast from the requesting node 100. The active node 100 may relinquish its position as the active node 100 to the requesting node 100 by subsequently broadcasting the identifier of the requesting node 100 as the "Active Node ID" 402.

In some embodiments, the active node 100 allows a requesting node 100 to become active immediately. In other embodiments, the active node 100 allows the requesting node 100 to become active after a predetermined amount of time or a predetermined number of requests, for example. In still more embodiments, the active node 100 allows a requesting node 100 to become active in accordance with the user of the active node 100 performing an input operation (such as a touch input in relation to a UI screen of a touch panel of the node 100) on the input device 108.

Figure 7:
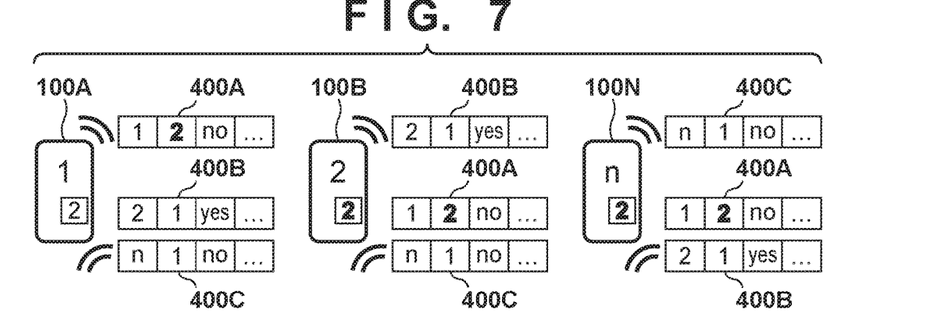
FIG. 7 illustrates an example in which the active node allows the requesting node to become the new active node.

FIG. 7 illustrates an example in which the active node 100A (identifier "1") allows the requesting node 100B (identifier "2") to become the new active node 100. Note that in the broadcast by the node 100A, "2" is broadcast as the "Active Node ID" 402 to allow node 100B whose identifier is "2" to become the new active node 100.

Figure 8:
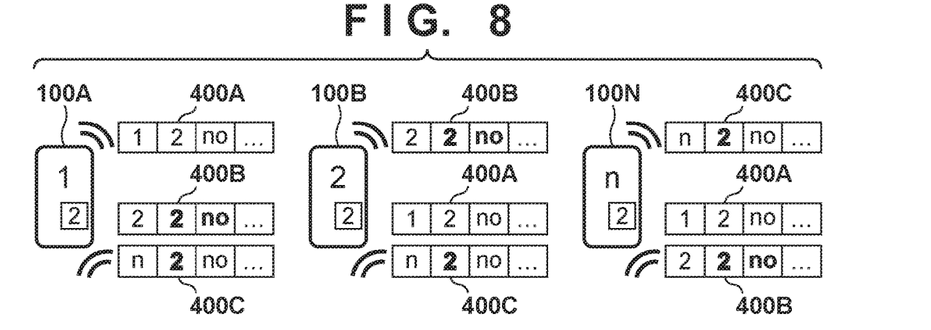
FIG. 8 illustrates an example in which the state of the mesh network becomes stable once again.

FIG. 8 illustrates an example in which the state of the mesh network becomes stable once again. When then inactive nodes 100 (identifiers "2"-"n") in FIG. 7 receive the broadcast from the active node 100A (identifier "1"), they update their local state (by accordingly rewriting information in the storage unit 104 or the RAM 102 for example) to reflect that the active node 100 has changed to node "2". Also, in subsequent broadcasts, they transmit the identifier of the new active node 100B which is "2" as the "Active Node ID" 402. Similarly, the node 100A that was active (identifier "1") but relinquished its role as the active node 100, transmits the identifier of the new active node 100B which is "2" as the "Active Node ID" 402. In this way, the state of the network (the currently active node 100) is updated dynamically, and propagated to all of the nodes 100 in the mesh network rapidly.

In some situations, a node 100 may determine that the current state of the network is inconsistent when it receives the broadcasts from the other nodes 100. For example, two nodes 100 that are initially within range of the transaction apparatus 200 but not in range of each other would each determine itself to be the active node 100. However, if the two nodes 100 were to subsequently move within range of each other, they would receive the broadcasts from each other and determine that they both are asserting themselves to be the active node 100 in the "Active Node ID" 402. In such a case, the nodes 100 may once again determine which of the nodes 100 that is asserting itself to be active is indeed the active node 100 by the procedure described above (using the estimated distance, the identifier, or the like). Furthermore, this redetermination of the active node 100 would be propagated to the inactive nodes 100 in the subsequent broadcasts from the nodes performed the redetermination. For example, an inactive node 100 whose internal state was set to indicate as active the node 100 that became inactive by the redetermination, would update its locally stored "Active Node ID" 402 information in accordance with the "Active Node ID" 402 that the node that became inactive broadcasts after the redetermination (i.e. the identifier of the node determined to remain active in the redetermination). In this way, corrections of inconsistencies propagate through the network rapidly.

Furthermore, situations may occur in which, when the current active node leaves the vicinity, or its power is suddenly turned off, other nodes 100 will internally store information indicating that the active node 100 is a node 100 that is no longer broadcasting periodically. In some embodiments such a situation can be handled by performing a redetermination of which node 100 is the active node 100 when no broadcast is received from the current active node 100 for a predetermined amount of time, for example.

In some embodiments, the plurality of nodes 100 includes devices that have the capability of scanning as described above, but do not have the capability of broadcasting. These nodes 100 are treated as "second class devices", whereas the nodes 100 having both broadcasting and scanning capabilities are treated as "first class devices". In such cases, the first class devices operate as is described in the example above. The second class devices, on the other hand, wait until they detect no broadcasts of any of the first class devices before they enter the active state. In such cases, conflicts between first class devices and second class devices can be avoided. Conflicts between two second class devices may be avoided by other means. For example, the second class devices may communicate with each other by WiFi in order to determine which is the active node 100 by a procedure similar to that described above.

Figure 9A:
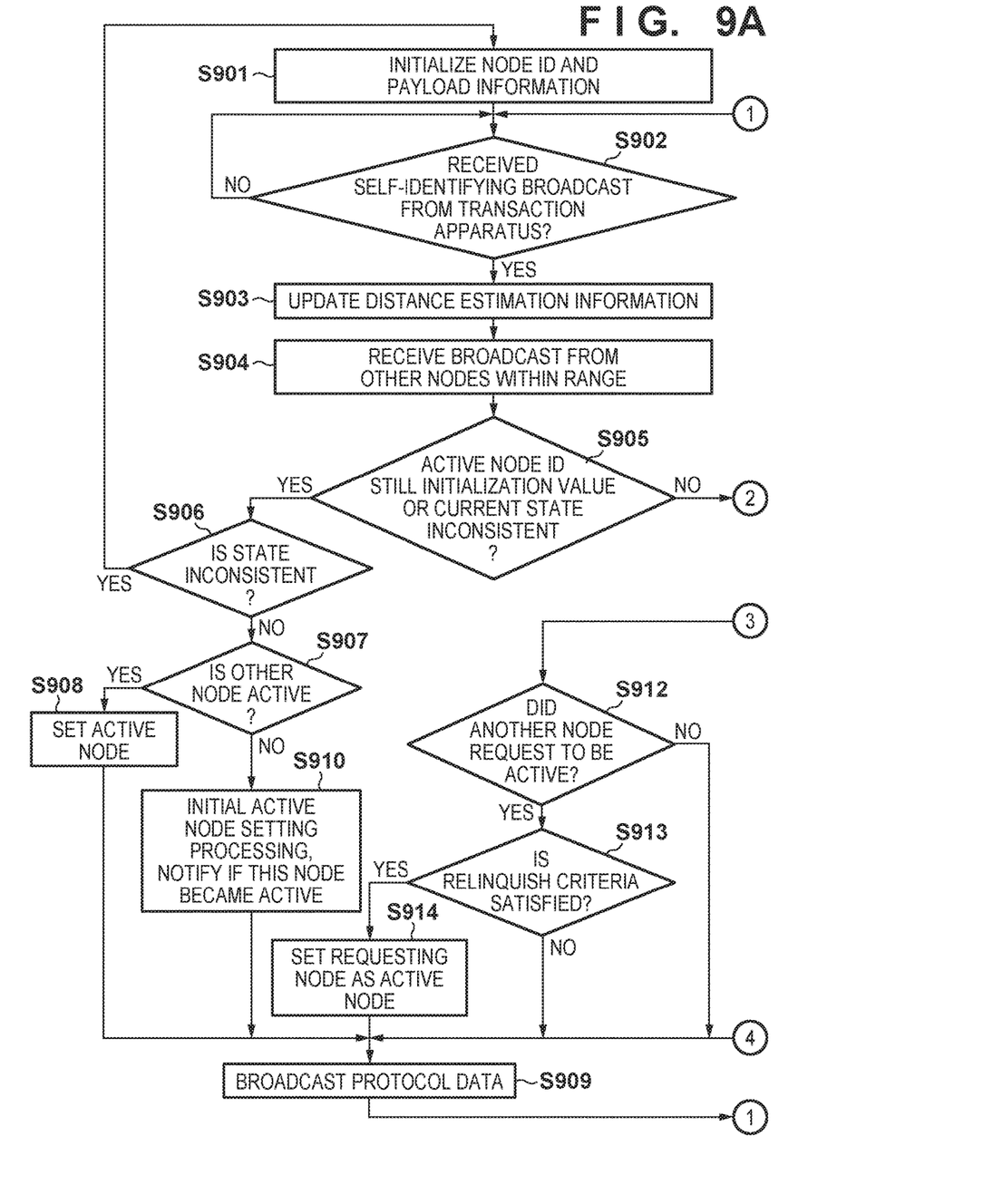
FIG. 9A and FIG. 9B are flowcharts that illustrate processing that each of the plurality of nodes that form the connectionless mesh-network perform according to embodiments of the present invention.
Figure 9B:
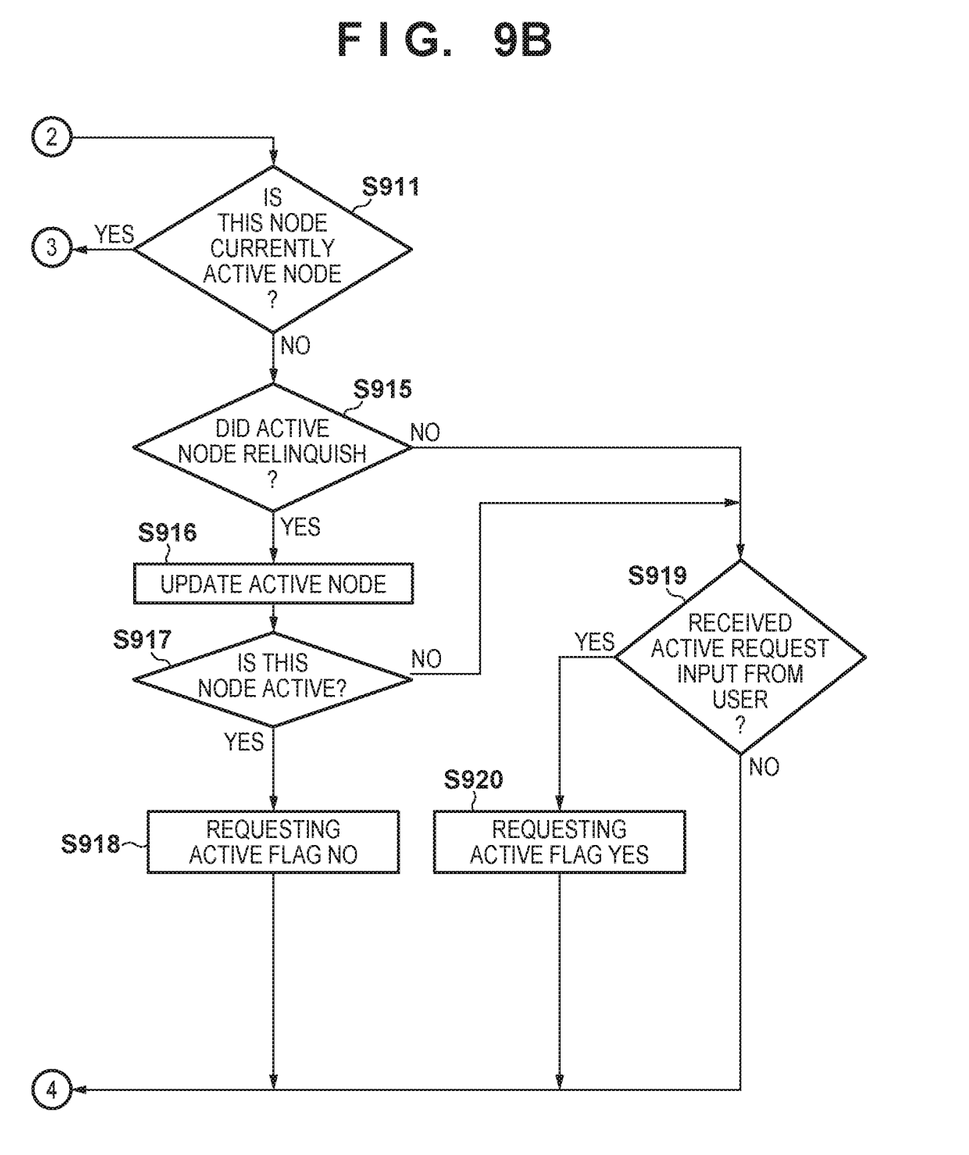

FIG. 9A and FIG. 9B are flowcharts that illustrate processing that each of the plurality of nodes 100 that form the connectionless mesh-network perform according to embodiments of the present invention. The node 100 realizes this processing by the CPU 101 reading a computer program that is stored in the ROM 103 into the RAM 102, and controlling the RAM 102, the storage unit 104, the transmitter 105, the receiver 106, the output device 107 and the input device 108 in accordance with the program, for example.

This processing may start when a user of the node 100 activates a program for a corresponding application by performing an operation using the input device 108, such as a touch operation on an icon corresponding to the application, for example.

In step S901, the CPU 101 initializes the node ID 401, the active node ID 402, the requesting active flag 403 and the distance estimation information 404 in the protocol data 400 by controlling the RAM 102 or the storage unit 104 to store initialization values. Note that in some embodiments, the distance estimation information 404 is not present, or the information of the payload information 400 is of a different format. Here, the node ID 401 may be initialized to a pseudo-randomly generated number within a predetermined range, as described previously. The active node ID 402 and the requesting active flag 403 may be set to predetermined initialization values (such as −1 for the active node ID 402 and NO for the requesting active flag 403, for example).

Next, the CPU 101 advances the processing to step S902, and determines whether the self-identifying broadcast was received in the periodic advertising broadcast from the transaction apparatus 200 via the receiver 106. If the advertising broadcast was received from the transaction apparatus 200, the CPU 101 advances the processing to step S903; otherwise, the CPU 101 repeats the processing of step S902. In embodiments that do not employ a transaction apparatus 200, step 902 is skipped.

In step S903, the CPU 101 updates the distance estimation information 404 in accordance with the broadcast received from the transaction apparatus 200, as described previously. In embodiments that do not employ the distance estimation information 404, step S903 is skipped.

Next, the CPU 101 advances the processing to step S904 and controls the receiver 106 to receive the respective protocol data 400 (the node ID 401 and the payload information of the active node ID 402, the requesting active flag 403, and the distance estimation information 404) in the periodic broadcast from all of the other nodes 101 within communication range. Note that this reception is performed without establishing connections with the respective other nodes 100.

Next, the CPU 101 advances the processing to step S905, and determines whether the active node ID 402 remains as the respective initialization value set in step S901. The purpose of this determination is to determine whether to perform later-described initial active node 100 setting processing.

In step S905, the CPU 101 also determines whether a current state of the protocol data 400 of the plurality of nodes 100 including itself (this node 100) is inconsistent based on the protocol data 400 received from the other nodes 100 and the current version of the protocol data 400 of the node 100 initialized in step S901. As described above, an inconsistent state may correspond to when two or more of the nodes 100 simultaneously broadcast that they are the active node 100 in the active node ID 402, or when the active node 100 suddenly ceases to broadcast, for example. Also, the inconsistent state may correspond to when two or more of the nodes 100 are determined to have the same node ID 401 for cases in which two or more nodes 100 coincidentally generate the same node ID 401 for themselves in step S901.

If the CPU 101 either determines that the information of the protocol data 400 remains as the respective initialization value, or determines that the state is inconsistent, it advances the processing to step S906.

In step S906, the CPU 101 again determines whether the state is inconsistent. If the state is inconsistent, the CPU 101 returns the processing to step S901. This serves the purpose of reinitializing the protocol data to cancel the inconsistent state so that the system self-corrects. Note that this flow is described for simplicity, but optimization can be achieved by performing processing to cancel the inconsistent state in accordance with how the state is inconsistent. For example, in other embodiments, nodes 100 whose IDs collide may reinitialize their IDs while other nodes 100 may ignore the collision, for example.

When, in step S906, the CPU 101 determines that the state is not inconsistent, it advances the processing to step S907. In step S907, the CPU 101 determines whether any of the other nodes 100 is currently active. It may do this by analyzing the respective protocol data, to see whether a non-initialization value (a positive, non-zero value for example) is set in the respective node IDs 401 received in step S904 in the broadcasts from the other nodes 100. Note that because the state was determined not to be inconsistent in step S906, only one other node 100 will be the active node 100 here.

If the CPU 101 in step S907 determines that another node 100 is active, the CPU 101 advances the processing to step S908 and controls the RAM 102 or the storage unit 104 to update the memory storing its current version of the active node ID 402 to the value of the node ID 401 received from the node 100 that is the active node in step S904, for example.

Next, the CPU 101 advances the processing to step S909, and controls the transmitter 105 to broadcast, at a predetermined frequency, its dynamically updated current version of the protocol data 400 that it stores in the RAM 102 or the storage unit 104, for example, to the other nodes 100. As described previously, this broadcast may be performed in a broadcasting role of BLE, and in accordance with iBeacon, for example. After performing the broadcast of step S909, the CPU 101 advances the processing to step S902, and the processing repeats.

If in step S907 the CPU 101 determines that no other node 100 is active, it advances the processing to step S910 and performs initial active node setting processing. The initial active node setting processing may comprise determining, as the active node 100, the node 100 of the plurality of nodes 100 estimated to be closest to the transaction apparatus 200 in accordance with the respective distance estimation information 404, as previously mentioned. Also, the initial active node setting processing may comprise determining the active node 100 in accordance with the respective node IDs 401 of the nodes 100. For example, the node 100 whose node ID 401 is the smallest (or the largest) of the nodes 100 may be determined to be the active node 100. The CPU 101 controls the RAM 102 or the stored memory 104 to update the memory that stores the current value for the node ID 401, for example. Then, the CPU 101 advances the processing to step S909.

Returning to step S905, if the CPU 101 determines that the information of the protocol data 400 does not remain as the respective initialization value, and also determines that the state is not inconsistent, it advances the processing to step S911.

In step S911, the CPU 101 determines whether the node 100 is currently the active node 100. Specifically, the CPU 101 reads the active node ID 402 in its current version of the protocol data 400 stored in the RAM 102 or the storage unit 104 and determines whether it is the same as its node ID 401 which it initialized in step S901.

If the CPU 101 determines that the node 100 is currently the active node 100, it advances the processing to step S912, and the CPU 101 determines whether one of the other nodes 100 requested to become the active node 100. The CPU 101 makes this determination by reading the request active flag 403 in the protocol data 400 received from each of the other nodes 100 in step S904.

If the CPU 101 determines that another node 100 did request to become the active node 100, it advances the processing to step S913; otherwise it advances the processing to step S909. In step S913, the CPU 101 determines if criteria for relinquishing the position of active node 100 to the node 100 that requests to become the active node 100 have been satisfied. As previously explained, these criteria may comprise that the node 100 has been determined to have requested to become active a predetermined number of times, that a predetermined amount of time has elapsed since the requesting node 100 requested to become active, that an input operation by the user of the node 100 to indicate the active node 100 to relinquish the position as the active node was received through the input device 108, or the like. Note that if a plurality of other nodes 100 are simultaneously requesting to become the active node 100, the processing of step S913 can be performed on these nodes 100 one at a time until one is determined to be the active node 100 or all are determined not to meet the relinquishing criteria.

If the CPU 101 determines that the criteria for relinquishing the position of active node 100 is satisfied, it advances the processing to step S914 and sets the identifier of the requesting node 100 as the active node ID 402 in its protocol data 400. Next, the CPU 101 advances the processing to step S909.

In step S913, if the CPU 101 determines that the criteria for relinquishing the position of active node 100 is not satisfied by any other node 100 requesting to become the active node 100, it advances the processing directly to step S909, leaving its current active node ID 402 as is.

Returning to step S911, when the CPU 101 determines that the node 100 is not currently the active node 100, it advances the processing to step S915. In step S915, the CPU 101 determines whether the current active node 100 changed from the last periodic broadcast received from the other nodes 100. It does this by reading the active node ID 402 in the protocol data 400 received from the other node 100 that was the active node up until that point and determining whether the node ID 401 and the active node ID 402 received in step S904 from that other node 100 are the same. If these are not the same, it means that the active node 100 relinquished its position as the active node 100.

If the CPU 101 determines in step S915 that the active node 100 up until that point relinquished its position as the active node 100, the CPU 101 advances the processing to step S916; if not it advances the processing to step S919. In step S916, the CPU 101 updates its current version of the node ID 401 stored in the RAM 102 or the storage memory 104 to be the new active node 100 (that is, the node 100 having the identifier that the old active node 100 broadcast in the active node ID 402 which is received in step S904). Then the CPU 101 advances the processing to step S917.

In step S917, the CPU 101 determines whether the node 100 became the active node 100. It does this by determining whether the ID that it set in step S916 is the same as the ID of the node 100 which was initialized in step S901. If the node 100 became the active node 100, the CPU 101 advances the processing to step s918; otherwise it advances the processing to step S919.

In step S918, the CPU resets the current version of the requesting active flag 403 to NO. Next the CPU 101 advances the processing to step S909.

In step S919, the CPU 101 determines whether a request to become active was received from a user of the node 100 through the input device 108. As explained previously, such an input may correspond to a touch operation on a button displayed in the application of the program that started the processing of this flowchart, for example.

If the CPU 101 determines that the request to become active was received, it advances the processing to step S920; otherwise it advances the processing to step S909. In step S920, the CPU 101 updates its current version of the requesting active flag 403 in the protocol data 400 to be YES, and then advances the processing to step S909.

Note that the CPU 101 may control to cause the node 100 to perform an active-operation in conjunction with determining that the node 100 became the active node (in step S910 or step S916, for example). Similarly, the CPU 101 may cause the node 100 to perform a non-active-operation in conjunction with determining that another node 100 became the active node (in step S910, step S914, or step S916, for example). The active operation may correspond to notifying the user, by controlling the output device 107, that the node 100 became active; and the non-active operation may be to similarly notify that the node 100 became non-active, for example. Such a notification can indicate to the user that the node 100 became/ceases to be the active node 100. In the example given above, this notification indicates to the user whether the node 100 is ready to receive the reward information communication from the transaction apparatus 200, and so the user can use the notification to time their purchase from the vending machine.

In this way, by the processing of FIG. 9A and FIG. 9B, the node 100 updates the node ID 401 which is an identifier that identifies the node 100 (step S901), and the active node ID 402 (step S908, step S910, step S914, step S916), the requesting active flag 403 (step S918, step S920) and the distance estimation information 404 (step S903) which are the data payload of its protocol data 400. In step S909, the node periodically broadcasts, as broadcast-information (the protocol data 400), this dynamically updated payload information as well as the node ID 401 to all of the other nodes 100. Furthermore, the node 100 periodically receives, in step S904, other-broadcast-information (the respective protocol data of the other nodes 100). The other-broadcast-information is the broadcast-information (the node ID 401, the active node ID 402, the requesting active flag 403 and the distance estimation information 404 which is dynamically updated by the respective node 100 by corresponding processing) respectively broadcast from each of the one or more other nodes 100. By virtue of this processing, it becomes possible for a plurality of nodes 100 to rapidly form a mesh network to communicate to each other which one of the nodes 100 is the current active node 100 without needing to establish connections therebetween.

The present invention is not limited to the above described example, and may be applied as appropriate to other applications (games such as tag, capture the flag, hot potato, or rock-paper-scissors, for example).

By virtue of the present invention, it is possible to improve performance and reduce complexity in a mesh network in which small amounts of data are propagated wirelessly to all nearby nodes 100. This may be advantageous in situations where reduction of connection overhead and management of multiple connections is given higher priority over security or reliability, for example.

What is claimed is:

1. A mobile device operable to form a connection-less mesh network with one or more other mobile devices, only the mobile device or only one of the other mobile devices being an active node configured to communicate with a transaction apparatus, each of the mobile devices comprising:
   a transmitter configured to transmit information wirelessly to the one or more other mobile devices;
   a receiver configured to receive wirelessly transmitted information from the one or more other-mobile devices;
   one or more memories configured to store a program and a first data payload containing a first identifier; and
   one or more processors configured to read the program from the one or more memories, and to control, in accordance with the program, the transmitter and the receiver by executing the program,
   wherein the one or more processors are further configured to:
      generate a second identifier that identifies the mobile device;
      update the first data payload containing the first identifier using the second identifier to generate a second data payload;
      store the second data payload;
      cause the transmitter to wirelessly broadcast, at a predetermined frequency, the second data payload; and
      receive, at a predetermined frequency, other second data payloads broadcast from each of the one or more other mobile devices,
   and wherein the one or more processors is further configured to update the second data payload in accordance with the other second data payloads from the other mobile devices and wherein the first data payload comprises a first active-node-information and the second data payload each comprise a second active-node-information and each of the first data payload and the second data payload indicate which of the mobile devices is currently the active node configured to communicate with the transaction apparatus and wherein the one or more processors are further configured to update the second data payload using either the first active-node-information or one of the second active-node-information to specify which one of the mobile devices is the active node.

2. The mobile device according to claim 1, wherein the one or more processors are further configured to determines which of the mobile device and the other mobile devices is the active node in accordance with the second active-node-information contained in the other second data payloads broadcast by the other mobile devices, and
   to update the second data payload using one of the second active-node-information of the other second data payloads to indicate the second identifier of the one of the mobile device determined to be the active node.

3. The mobile device according to claim 2, wherein the one or more processors are further configured to updates the second active-node-information of the second data payload with a second active-node-information contained in the other second data payloads to indicate the second identifier of a new active node, as the active node, in response to a second active-node-information contained in the other second data payloads indicating that the active node is a different mobile device than the mobile device indicated to be the active node in the second data payload stored on the mobile device.

4. The mobile device according to claim 3, wherein the second data payload further comprises:
   active-request-information indicating whether one of the mobile devices desires to become the active node, and wherein
   the one or more processors are further configured to determine which of the mobile devices is the active node in accordance with the second active-node-information and the active-request-information contained in the second data payloads received from each of the other mobile devices.

5. The mobile device according to claim 4, wherein if the mobile device was previously determined to be the active node, the one or more processors are further configured to updates the second active-node-information that the transmitter broadcasts to indicate an identifier of a one of the other mobile devices broadcasting active-request-information that indicates that said one of the other mobile device desires to become the active node.

6. The mobile device according to claim 5, wherein the one or more processors are further configured to updates the second active-node-information that the transmitter broadcasts to indicate the identifier of one of the other mobile devices broadcasting active-request-information that indicates that said mobile device desires to become the active node after a predetermined amount of time elapses from when the active-request-information is received by the mobile device; or
   in response to determining that the active-request-information received from one of the other mobile devices is received a predetermined number of times.

7. The mobile device according to claim 5, further comprising:
   an input device configured to receive relinquish-request-information that is input in accordance with an operation by a user of the mobile device to request the mobile device relinquish position as the active node,
   wherein the one or more processors is further configured to updates the second active-node-information that the transmitter broadcasts to indicate the identifier of one of the other mobile devices in accordance with the input device receiving the relinquish-request-information.

8. The mobile device according to claim 1,
wherein the one or more processors are further configured to determines whether information of the second data payload remains in an initialization state, and
in response to determining the second data payload remains in the initialization state the one or more processor are further configured to update the second active-node-information to indicate an identifier of one of the other mobile devices indicated as the active node in the other second data payloads,
and wherein the one or more processors are further configured to indicate the identifier of the mobile device or an identifier of one of the other mobiles devices in accordance with an initial active node setting if none of the second active-node-information of the other second data payloads indicates an identifier of any of the mobiles devices as the active node.

9. The mobile device according to claim 8, wherein the initial active node setting is performed in accordance with the respective identifiers of the mobile device and the other mobile devices.

10. The mobile device according to claim 8, wherein the one or more processors are further configured to:
generate distance-estimation-information which indicates an estimation of a distance between the mobile device and the transaction apparatus based on a signal of a broadcast from the transaction apparatus that the received at the mobile device and
cause the mobile device to update the second data payload with the received distance estimation information, and
wherein the initial active node setting is performed in accordance with the distance-estimation-information of the mobile device and the distance-estimation-information of the other mobile devices.

11. The mobile device according to claim 10,
wherein the one or more processors are further configured to determine whether the second data payload and the other second data payloads are in an inconsistent state, and
in response to determining the inconsistent state, the one or more processors are further configured to re-initializes the second data payload.

12. The mobile device according to claim 11,
wherein the one or more processors are configured to cause the mobile device to perform an active-operation in conjunction with the one or more processors determining that the mobile device became the active node, and to cause the mobile device to perform a non-active-operation in conjunction with the one or more processors determining that one of the other mobile device became the active node.

13. The mobile device according to claim 12, further comprising:
an output device configured to output information to a user of the mobile device,
wherein the active-operation corresponds to the output device outputting a notification indicating that the mobile device became the active node, and the non-active-operation corresponds to the output device outputting a notification indicating that the mobile device became not the active node.

14. The mobile device according to claim 13, wherein the second data payload and the other second data payloads are broadcast without establishing a connection between the mobile device and the other mobile devices by making a connection request that includes a parameter, and performing communication directed from the mobile device to any of the other mobile devices in accordance with the parameter.

15. The mobile device according to claim 1, wherein the one or more processors are further configured to generates any of the first identifier and the second identifier to be a pseudo-random number within a predetermined range.

16. The mobile device according to claim 1, wherein the broadcasting is performed in a peripheral (broadcasting) role of BLE (Bluetooth Low Energy), and the receiving is performed in a central (observer) role of BLE.

17. The mobile device according to claim 16, wherein the broadcasting is performed in accordance with the iBeacon advertising specification.

18. A connection-less mesh network system comprising a plurality of mobile devices, only one of the mobile devices being an active node configured to communicate with a transaction apparatus, each mobile device comprising:
a transmitter operable to transmit information wirelessly to the other mobile devices;
a receiver operable to receive wirelessly transmitted information from the other mobile devices;
one or more memories configured to store a program and a first data payload containing a first identifier; and
one or more processors configured to read the program from the one or more memories, and to control, in accordance with the program, the transmitter and the receiver by executing the program,
wherein the one or more processors are configured to:
generate a second identifier that identifies the mobile device;
update the first data payload containing the first identifier using the second identifier to generate a second data payload;
store the second data payload;
cause the transmitter to wirelessly broadcast, at a predetermined frequency, the second data payload; and
receive, at a predetermined frequency, other second data payloads broadcast from each of the one or more other mobile devices,
and wherein the one or more processors is further configured to update the second data payload in accordance with the other second data payloads from the other mobile devices and wherein the first data payload comprises a first active-node-information and the second data payload each comprise a second active-node-information and each of the first data payload and the second data payload indicate which of the mobile devices is currently the active node configured to communicate with the transaction apparatus and wherein the one or more processors are further configured to update the second data payload using either the first active-node-information or one of the second active-node-information to specify which one of the mobile devices is the active node.

19. A method of controlling a mobile device operable to form a connection-less mesh network with one or more other mobile devices, only the mobile device or only one of the other mobile devices being an active node configured to communicate with a transaction apparatus, the method comprising:
generating, by the mobile device, an identifier that identifies the mobile device;
updating, by the mobile device, the mobile device to use the identifier and updating a first data payload stored on the mobile device to contain the identifier;

periodically wirelessly broadcasting the first data payload that contains the identifier and the updated first data payload; and periodically receiving, from the other mobile devices, second data payloads, wherein the mobile device is configured to update the first data payload in accordance with the second data payloads from the other mobile devices and wherein the first data payload comprises a first active-node-information and the second data payload comprises a second active-node-information both of which indicate which of the mobile devices is currently the active node configured to communicate with the transaction apparatus and wherein the first payload is updated using either the first active-node-information or the second active-node-information add to specify which one of the mobile devices is the active node.

20. A non-transitory computer-readable storage medium storing a program for causing a computer to execute instructions for controlling a mobile device operable to form a connection-less mesh network with one or more other mobile devices, only the mobile device or only one of the other mobile devices being an active node configured to communicate with a transaction apparatus, the instructions comprising:

generating, by the mobile device, an identifier that identifies the mobile device;

updating, by the mobile device, the mobile device to use the identifier and updating a first data payload stored on the mobile device to contain the identifier;

periodically wirelessly broadcasting the first data payload that contains the identifier and the updated first data payload; and periodically receiving, from the other mobile devices, second data payloads, wherein the mobile device is configured to update the first data payload in accordance with the second data payloads from the other mobile devices and wherein the first data payload comprises a first active-node-information and the second data payload comprises a second active-node-information both of which indicate which of the mobile devices is currently the active node configured to communicate with the transaction apparatus and wherein the first payload is updated using either the first active-node-information or the second active-node-information to specify which one of the mobile devices is the active node.

* * * * *